US010047727B2

(12) United States Patent
Röer et al.

(10) Patent No.: US 10,047,727 B2
(45) Date of Patent: Aug. 14, 2018

(54) WIND TURBINE COMPRISING A TRANSPORT UNIT

(71) Applicant: Wobben Properties GmbH, Aurich (DE)

(72) Inventors: Jochen Röer, Ganderkesee (DE); Jan-Phillip Köhler, Holtrop (DE)

(73) Assignee: Wobben Properties GmbH, Aurich (DE)

( * ) Notice: Subject to any disclaimer, the term of this patent is extended or adjusted under 35 U.S.C. 154(b) by 257 days.

(21) Appl. No.: 14/907,236

(22) PCT Filed: Jul. 18, 2014

(86) PCT No.: PCT/EP2014/065545
§ 371 (c)(1),
(2) Date: Jan. 22, 2016

(87) PCT Pub. No.: WO2015/014640
PCT Pub. Date: Feb. 5, 2015

(65) Prior Publication Data
US 2016/0169203 A1 Jun. 16, 2016

(30) Foreign Application Priority Data
Jul. 30, 2013 (DE) .................. 10 2013 214 920

(51) Int. Cl.
*F03D 11/04* (2006.01)
*F03D 80/80* (2016.01)

(52) U.S. Cl.
CPC ............. *F03D 80/85* (2016.05); *F03D 80/88* (2016.05); *F05B 2240/916* (2013.01); *Y02E 10/726* (2013.01); *Y02E 10/728* (2013.01)

(58) Field of Classification Search
CPC . F03D 80/85; F03D 80/88; F03D 7/02; F03D 80/80; F03D 80/82; F03D 13/20;
(Continued)

(56) References Cited

U.S. PATENT DOCUMENTS 8,052,396 B2   11/2011  Wobben
8,366,396 B2 *  2/2013  Barton .................... H02G 3/32
                                                          416/146 R
(Continued)

FOREIGN PATENT DOCUMENTS

CL        199501325        8/1995
DE        10224439 A1     12/2003
(Continued)

*Primary Examiner* — Eldon Brockman
(74) *Attorney, Agent, or Firm* — Seed Intellectual Property Law Group LLP (57) ABSTRACT

A wind turbine is provided, with a tower with a longitudinal axis, a nacelle on the tower, multiple power cables which extend from the nacelle into the tower and a transport unit. The transport unit is fastened inside the nacelle and serves to transport loads inside the tower to the nacelle. The transport unit has a cable guide unit with multiple rings, wherein the power cables are fastened to the circumference of the rings so that a region inside the rings is kept free for transporting the load. A top ring is fastened to the nacelle and a bottom ring is fastened non-rotatably in or on the tower. The bottom ring has a non-rotatable guide along the longitudinal axis of the tower.

10 Claims, 8 Drawing Sheets

(58) Field of Classification Search
CPC . Y02E 10/726; Y02E 10/728; F05B 2240/916
See application file for complete search history.

(56) References Cited

U.S. PATENT DOCUMENTS

| | | | | |
|---|---|---|---|---|
| 8,647,065 | B2* | 2/2014 | Hanisch | F03D 80/50 |
| | | | | 416/146 R |
| 8,747,073 | B2* | 6/2014 | Ollgaard | B66D 1/36 |
| | | | | 416/244 A |
| 9,051,920 | B2* | 6/2015 | Prebio | F03D 11/00 |
| 9,190,823 | B2 | 11/2015 | Schubert | |
| 2009/0284012 | A1 | 11/2009 | Mortensen | |
| 2010/0247326 | A1* | 9/2010 | Prebio | F03D 11/00 |
| | | | | 416/244 R |
| 2010/0310375 | A1* | 12/2010 | Hanisch | F03D 80/00 |
| | | | | 416/146 R |
| 2011/0155420 | A1* | 6/2011 | Ollgaard | B66D 1/36 |
| | | | | 174/135 |
| 2012/0006578 | A1* | 1/2012 | Schubert | H02G 11/003 |
| | | | | 174/79 |
| 2012/0201677 | A1 | 8/2012 | Krishnan et al. | |
| 2013/0106112 | A1* | 5/2013 | Moestrup | F03D 11/0066 |
| | | | | 290/55 |

FOREIGN PATENT DOCUMENTS

| | | |
|---|---|---|
| DE | 102009013728 A1 | 9/2010 |
| EP | 2505822 A1 | 10/2012 |
| EP | 2587054 A2 | 5/2013 |
| JP | H11236982 A | 8/1999 |
| JP | 2004084518 A | 3/2004 |
| JP | 2008298051 A | 12/2008 |
| RU | 2078994 C1 | 5/1997 |
| RU | 2131997 C1 | 6/1999 |

* cited by examiner

WIND TURBINE COMPRISING A TRANSPORT UNIT

BACKGROUND

Technical Field

The present invention relates to a wind turbine.

Description of the Related Art

A wind turbine typically has a tower and a nacelle which is placed on top of the tower. The nacelle carries the rotor (the rotating part) of the wind turbine. The wind turbine has a transport device for transporting loads (for example, for maintenance purposes) from the ground into the nacelle. The azimuth angle of the nacelle can be adjusted in order to track the direction of the wind. An electric generator, which is coupled directly or indirectly to the rotor of the wind turbine, can be provided in the nacelle. The electrical energy generated by the generator is transported, for example via cables inside the tower, to the region of the foot of the tower. Because the nacelle tracks the direction of the wind, it may occur that the nacelle rotates many times about the axis of the tower. This can be critical in particular with respect to twisting of the power cables from the generator to the foot of the tower.

DE 10 2009 013 728 A1 discloses a wind turbine with a twistable nacelle cable guide.

DE 102 24 439 A1 describes a method for assembling or disassembling components of a wind turbine. In this method, a winch is situated on the ground and a rope runs to the nacelle, over deflecting rollers, and back down again. A winch is additionally provided in the nacelle. The winch serves to transport loads outside the tower, up into the nacelle.

BRIEF SUMMARY

One or more embodiments of the present invention provide a wind turbine which has improved options for transporting loads into the nacelle.

A wind turbine is thus provided which has a tower with a longitudinal axis, a nacelle provided on the tower so that it can rotate, multiple (power) cables which extend from the nacelle into the tower, and a transport unit. The transport unit is fastened inside the nacelle and serves to transport loads inside the tower to the nacelle, or down to the ground. The transport unit has a cable guide unit with multiple rings, wherein the (power) cables are fastened to the circumference of the rings so that a region inside the rings is kept free for transporting the load. A top ring is fastened to the nacelle and a bottom ring is fastened non-rotatably in or on the tower. The bottom ring has a non-rotatable guide along the longitudinal axis of the tower.

Power cables here represent those cables which are used to transmit the electrical energy generated in a generator, for example to a power cabinet in the tower of the wind turbine. The power cables can in particular serve to transmit DC, i.e., the cables are coupled to the output of a rectifier which is, for example, arranged in the nacelle of the wind turbine and converts alternating current, generated by the electrical generator of the wind turbine, into direct current. Alternatively, the power cables can of course also be used to transmit alternating current.

According to an aspect of the present invention, the power cables are arranged on the outer circumference of the rings.

According to another aspect of the present invention, the bottom ring has at least two ring guides so that they can be guided along the guide, wherein the guide extends along the longitudinal axis of the tower.

According to another aspect of the present invention, the extent of the cables between adjacent rings is taken into account when calculating the maximum available internal diameter of the rings for transporting the load.

One or more embodiments of the invention relates to the concept of providing a wind turbine with a tower and a nacelle. A transport unit is provided in the nacelle. In the transition region between the nacelle and the tower, the transport unit has multiple rings to which cables or power cables are fastened. The rings have a minimum diameter so that a transport basket of the transport unit can be transported through the rings. The bottom ring is fastened non-rotatably to the tower wall via at least one guide rail. The bottom ring can thus only move vertically, up or down, and not move rotatably.

Other embodiments of the invention are the subject of the subclaims.

BRIEF DESCRIPTION OF THE SEVERAL VIEWS OF THE DRAWINGS

Advantages and exemplary embodiments of the invention are explained in detail below with reference to the drawings, in which.

DETAILED DESCRIPTION

Figure 1:
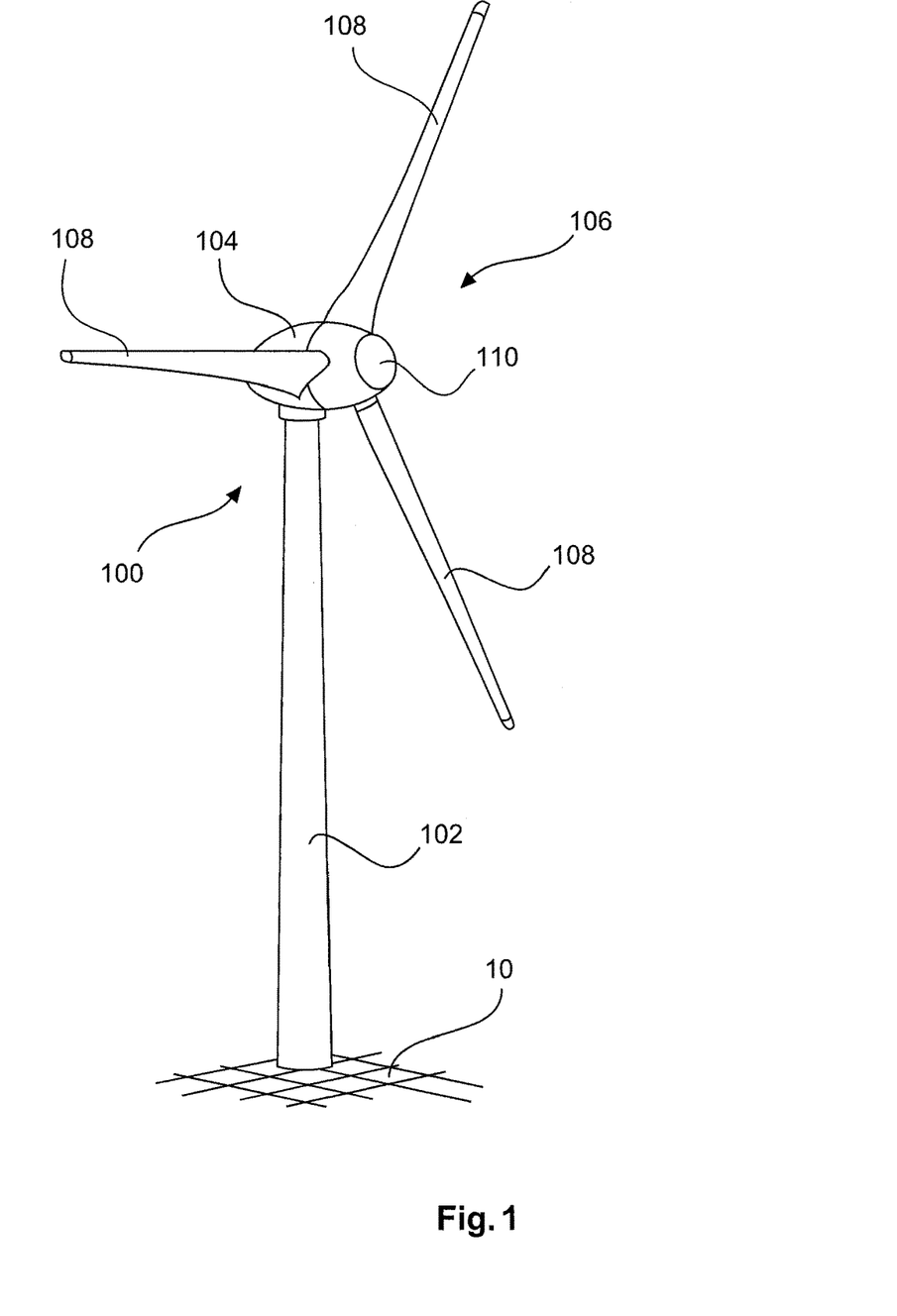
FIG. 1 shows a schematic view of a wind turbine according to the invention.

FIG. 1 shows a schematic view of a wind turbine according to one embodiment of the invention. The wind turbine 100 has a tower 102 and a nacelle 104 on top of the tower 102. An aerodynamic rotor 106 with three rotor blades 108 and a spinner 110 is provided on the nacelle 104. The aerodynamic rotor 106 is set in rotational motion by the wind when the wind turbine is operating and thus also turns a rotor of a generator which is coupled directly or indirectly to the aerodynamic rotor 106. The electric generator is arranged in the nacelle 104 and generates electric energy. The electric energy generated by the electric generator can be transmitted by means of power cables from the nacelle into the lower region of the tower, where the electric energy, which is present for example in the form of direct voltage, can be converted for example into alternating voltage. The pitch angles of the rotor blades 108 can be altered by pitch motors on the rotor blade roots of the respective rotor blades 108. The orientation of the nacelle 104 can be adjusted in order to track the direction of the wind. Power cables are laid from the nacelle 104 into the tower in order to transmit the energy generated by the generator.

Figure 2:
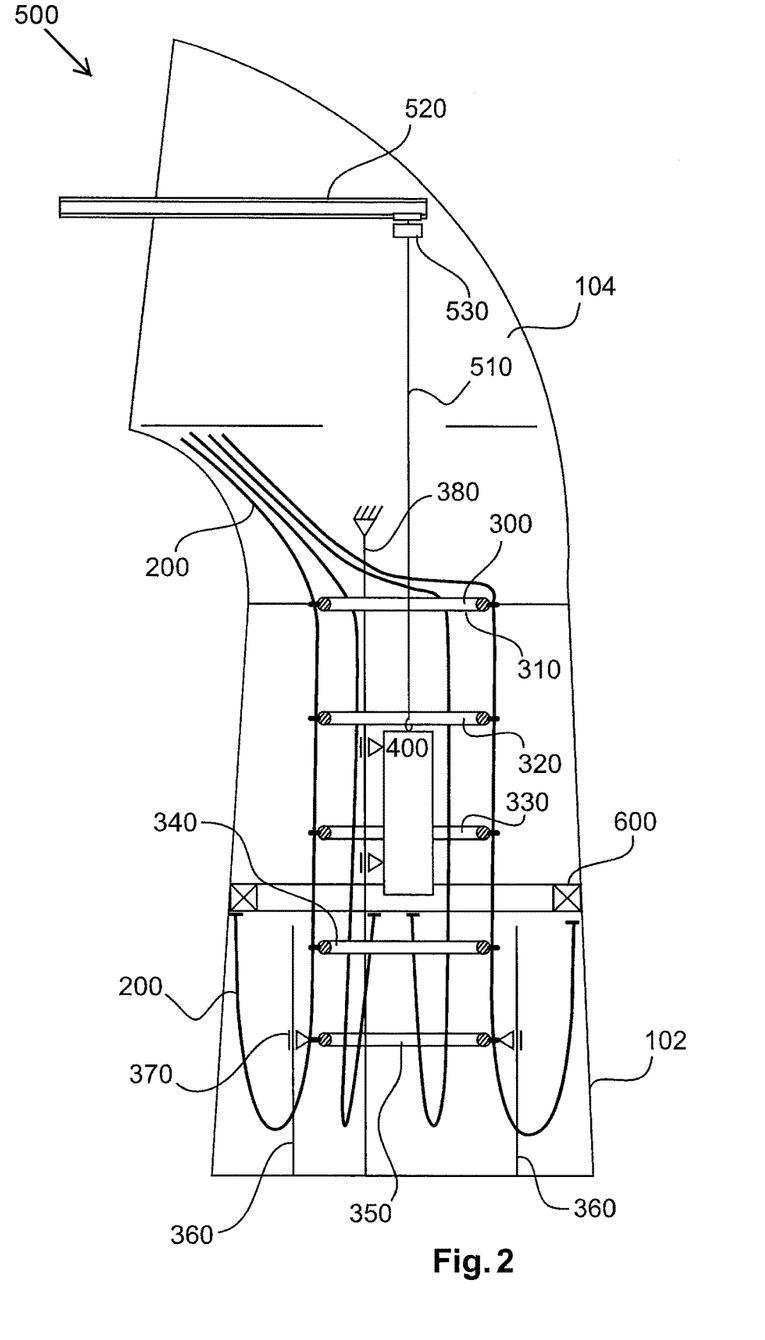
FIG. 2 shows a schematic view in cross-section of part of a wind turbine according to a first exemplary embodiment.

FIG. 2 shows a schematic view in section of part of a wind turbine according to a first exemplary embodiment. The transition between a tower 102 and a nacelle 104 is shown schematically in FIG. 2. The nacelle 104 is situated on top of the tower 102 and can be rotated by means of an azimuth bearing 600 in order to be rotated into its azimuth position. This takes place in order to track the direction of the wind so that the aerodynamic rotor is in the optimal position for the prevailing wind. Multiple power cables 200 lead from the nacelle 104 into the tower 102, down into the foot of the tower to power cabinets which are provided there. A transport unit 500 is provided in the nacelle 102. It serves to transport loads 400 inside the tower 102, up or down. A cable guide unit 300 is provided in the region between the nacelle and the tower 102 as part of the transport unit 500. The cable guide unit 300 has multiple rings 310, 320, 340, 350. Multiple power cables 200 are arranged along the circumference of the rings 310-350. The bottom ring 350 has a non-rotatable guide 360. The bottom ring 350 is held in the guide 360 via ring guides 370.

Because the power cables 200 are fastened to the circumference of the rings 310-350, the inner region between the rings is free and can be used by the transport unit 500 to transport loads 400 up or down.

The transport unit 500 can have a beam 520, a hoisting unit 530 and a chain 510 by means of which, for example, a load 400 can be conveyed inside the rings, up or down.

By means of the design of the cable fastening, it may be achieved that the loads can no longer be conveyed on the outside of the tower but inside the tower, up or down.

The top ring 310 is fastened to the nacelle. The bottom ring 350 is guided essentially non-rotatably in a guide 360 by means of a ring guide 370. This guide 360 extends along the longitudinal axis of the tower 102, i.e., vertically. The rings between the top ring 310 and the bottom ring 350 are mounted rotatably so that they can they can co-rotate correspondingly when the top ring 310 rotates and thus when the power cables rotate. Hereby the rotation of the top ring 310 is transmitted to the rings 320-340 situated below them via the power cables 200.

The load can be guided along the longitudinal axis of the tower by means of a guide rope 380.

Because the bottom ring 350 is guided non-rotatably, the bottom ring does not execute any rotation but only a translational lifting motion in the direction of the longitudinal axis of the tower when the power cables 200 are twisted.

When the nacelle rotates in order to track the direction of the wind, the top ring 310 rotates with the nacelle 104 and the cables 200 between the top ring 310 and the bottom ring 350 run helically about the preferably cylindrical space kept free by the rings 310-350. Because the cables 200 run in an increasingly helical fashion between the top ring 310 and the bottom ring 350, the rings from the top ring move up so that the rings execute a lifting motion. It should be pointed out hereby that the bottom ring 350 executes the greatest lifting motion.

The cable guide unit 300 is advantageous because, when the nacelle rotates, the power cables 200 are only curved and not twisted as well.

Because the power cables 200 are arranged along the circumference of the rings 310-350, the cables are ventilated better and hence cooled better. It can be achieved that the cables are guided with a very uniform curvature.

The transport unit 500 is used to transport a load 400 into the nacelle 104 or downwards, wherein the load 400 is transported upwards inside the rings 310-350 of the cable guide unit 300. The diameters of the rings 310-350 must thus be selected accordingly so that the loads to be transported can be transported upwards accordingly.

A transport and lifting unit is provided inside the nacelle and the tower. The lifting device and transport device has a beam 520 in the region of the nacelle, a chain hoist 530 and a chain or a rope 510 by means of which a load 400 can be transported up into the nacelle. The transport unit moreover has a cable guide unit 300 with multiple rings. The power cables 200 are fastened to the rings in such a way that the, for example, cylindrical region inside the rings 310-350 is kept free. This region can be used to transport loads 400 through the tower 102 into the nacelle.

The load 400 can have an external diameter of, for example, up to 400 mm.

When dimensioning the diameter of the rings 310-350, not only does the outer diameter of the load 400 to be transported need to be taken into consideration but also the route of the power cables 200 between two adjacent rings. It is understood that a cable between two adjacent rings assumes the shortest path between the suspension points on the two rings. This can result in the transport path and transport volume or transport diameter that actually remain within the rings being reduced.

Figure 3:
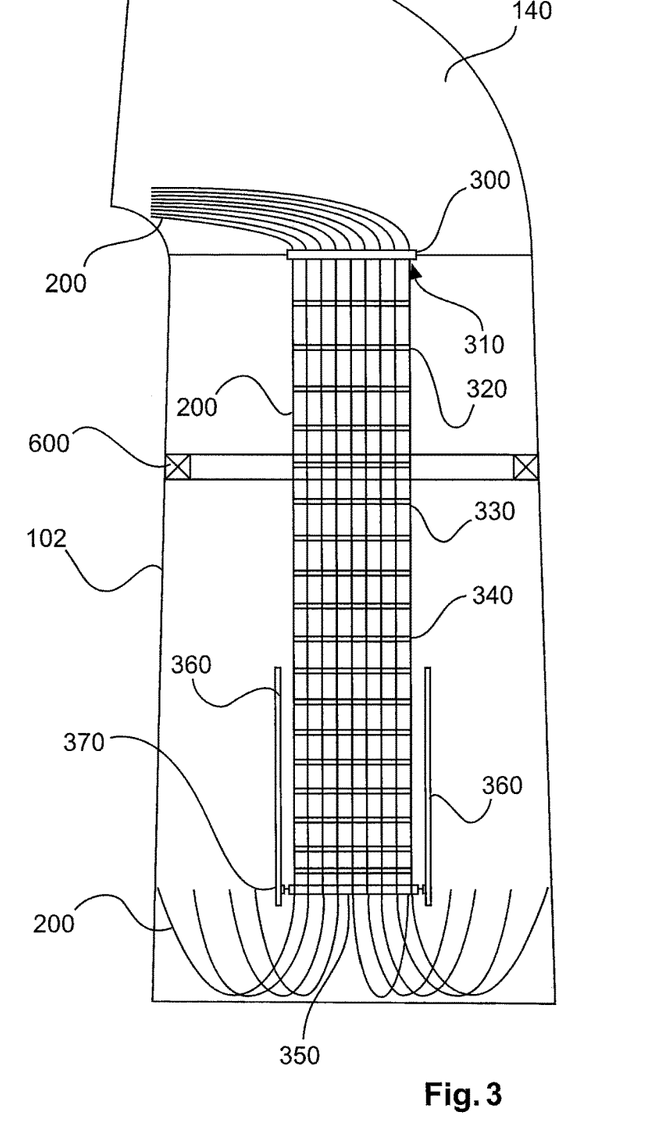
FIG. 3 shows a schematic view in cross-section of the wind turbine according to the first exemplary embodiment.

FIG. 3 shows a schematic view in section of part of a wind turbine according to a second exemplary embodiment. The cable guide unit 300 is shown in detail in FIG. 3. The cable guide unit 300 according to the second exemplary embodiment can be based on the cable guide unit according to the first exemplary embodiment. The cable guide unit 300 serves to guide the power cables 200 from the nacelle 104 into the tower 102. Any rotational motion of the nacelle is compensated by the cable guide unit 300. To do this, the cable guide unit 300 has multiple rings 310-350. The top ring 310 is preferably rigidly connected to the nacelle 104. The bottom ring 350 is held via a ring guide 370 in a guide 360 which extends along the longitudinal axis of the tower 102. According to the second exemplary embodiment, two guides 360 are provided. Alternatively, multiple guides can also be provided. The bottom ring 350 is thus mounted non-rotatably inside the guide 360. The rings 320-340 between the top ring 310 and the bottom ring 350 are provided as rotatable. When the nacelle 104 rotates, the top ring 320 co-rotates and the rings situated below it are co-rotated by co-rotation of the cables 200. The cables thus then extend helically. The greater the rotation of the nacelle 104 and hence the rotation of the top ring 310, the higher the rings 320-350 will be lifted up. The bottom ring 350 hereby is lifted up the most.

Figure 4:
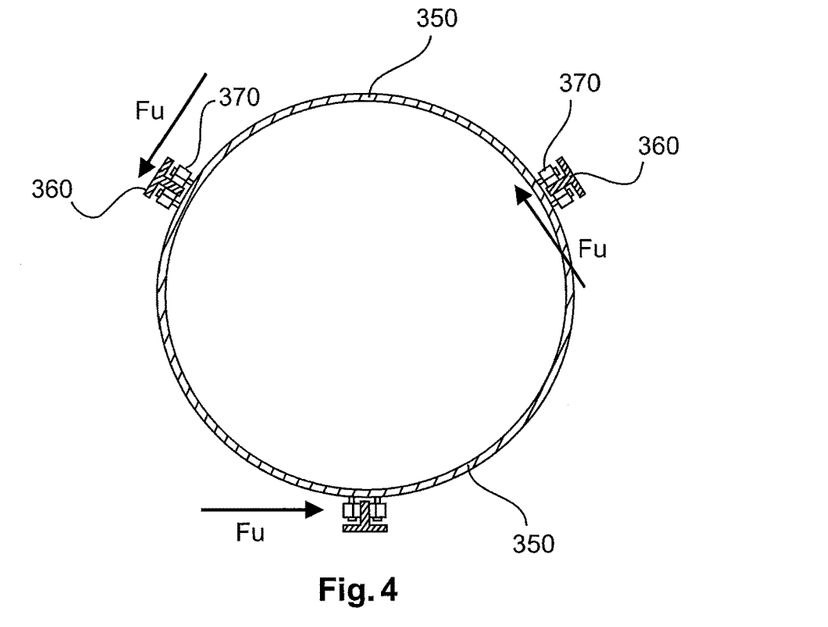
FIG. 4 shows a schematic view in cross-section of a bottom ring of a cable guide according to a second exemplary embodiment.

FIG. 4 shows a schematic view in section of a bottom ring 350 of a cable guide unit according to the first or second exemplary embodiment. The bottom ring 350 has three ring guides 370 so that the bottom ring 350 can be guided along three guides 360. At least two guides 360 and two ring guides 370 should be present on the bottom ring 350.

Figure 5:
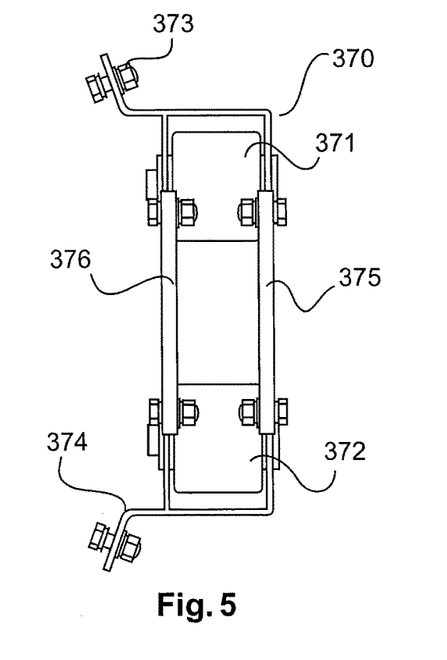
FIG. 5 shows a schematic view of a guide for the bottom ring of FIG. 4.

FIG. 5 shows a schematic view of a ring guide 370 of a bottom ring 350 of a cable guide unit according to the first or second exemplary embodiment. The ring guide 370 has two guide rollers 371, 372. The ring guide unit 370 can be fastened, for example, to the tower 102 via metal plates 373, 374. Spacer metal plates 375 can be provided between the guide rollers 371, 372. Plastic sliding elements 376 can optionally be provided on the inside of the spacer surface 365 between the two guide rollers 371, 372.

A connection between the cables 200 and the rings 310-350 can be made, for example, by cable ties.

The cables 200 can have a cable grip in order thus to be suspended on the nacelle.

Figure 6:
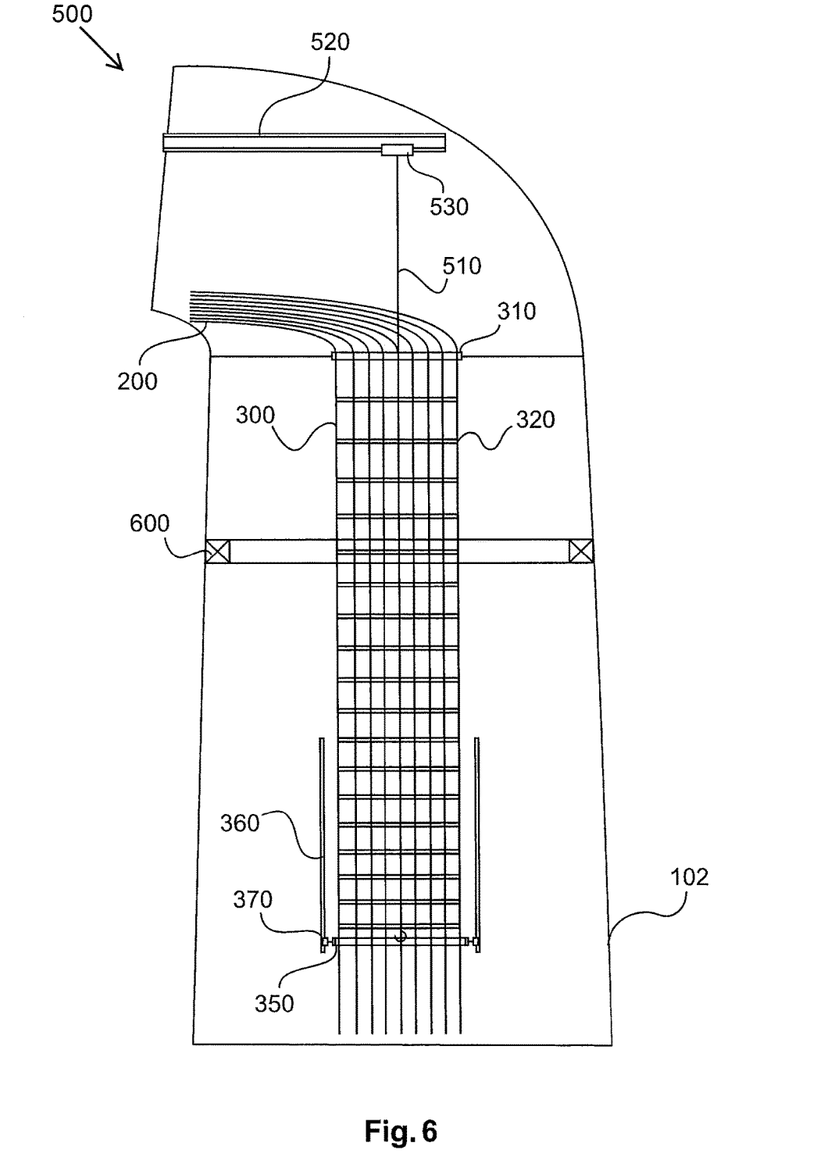
FIG. 6 shows a schematic view in cross-section of part of a wind turbine according to a third exemplary embodiment, and FIGS. 7-9 each show a schematic view in cross-section of part of a wind turbine according to a fifth exemplary embodiment.

FIG. 6 shows a schematic view in section of part of a wind turbine according to a third exemplary embodiment. The transport unit 500 with the cable guide unit 300 in particular is shown in FIG. 6. The transport unit has, for example, a beam 520 with a chain pull 530 and a chain or a rope 510. The rope 510 runs inside the rings 310-350 of the cable guide unit. The cable guide unit is thus part of the transport unit or is adapted to the transport unit. This is manifested in particular in the internal diameter of the rings 310 and the attachment of the cables 200 to the circumference of the rings 310. It can thus be ensured that the, for example, cylindrical region inside the rings remains free for transport. The design of the cable guide unit with the rings 320-350 and the ring guide 370 and guide 360 of the bottom ring 350 thus essentially corresponds to the design of the cable guide unit 300 according to the first or second exemplary embodiment.

Figure 7:
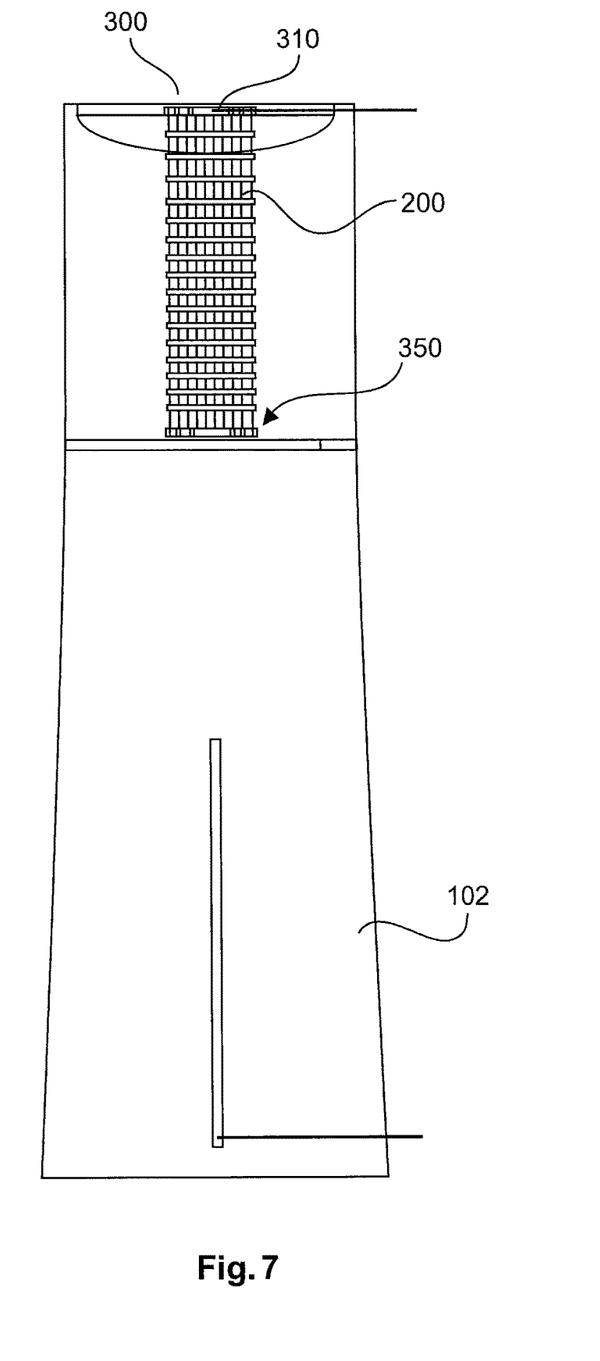
Figure 8:
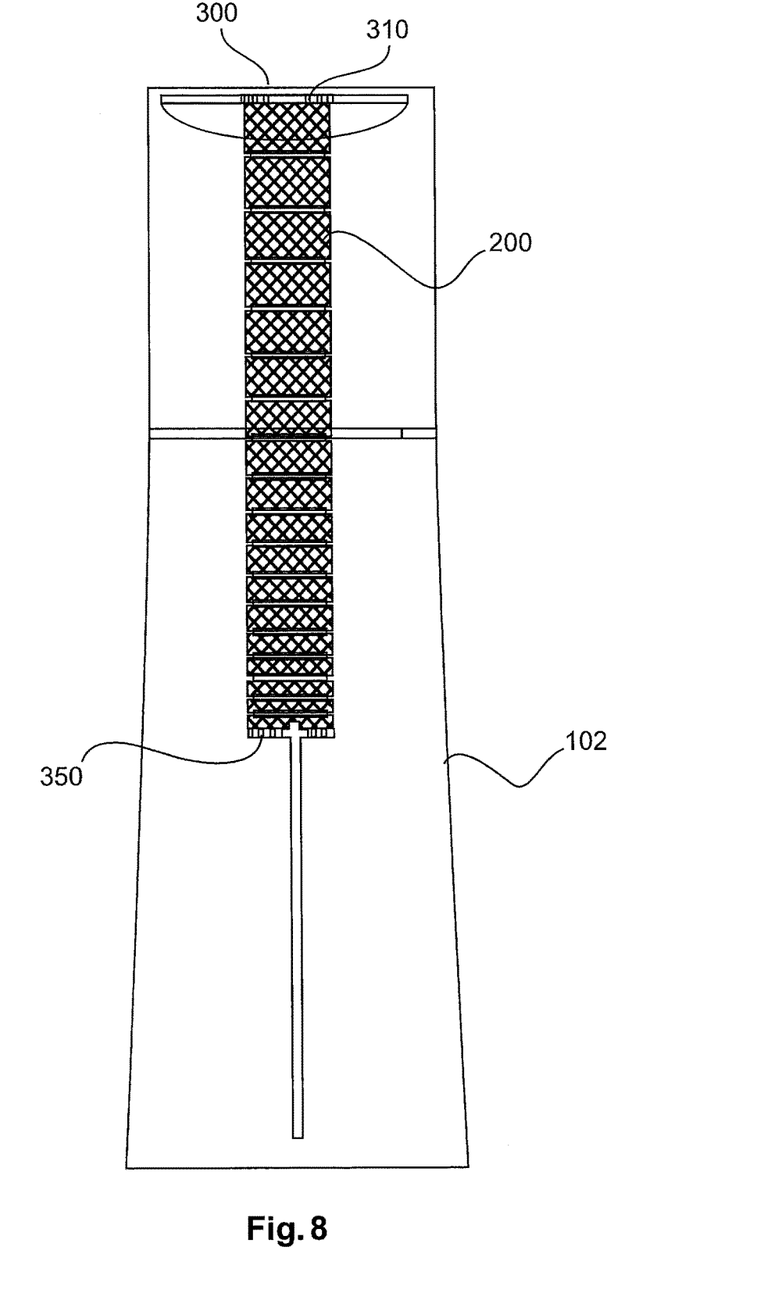
Figure 9:
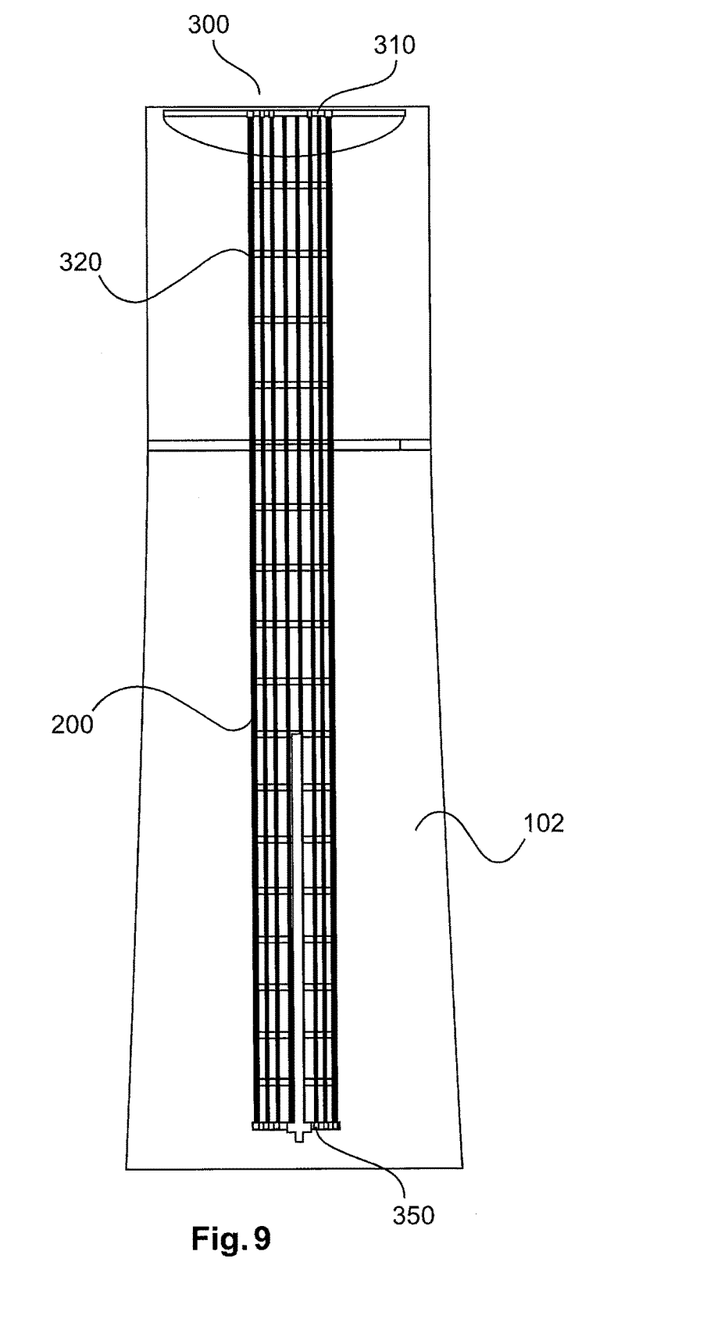

A schematic side view in cross-section of a tower of a wind turbine is shown in each case in FIGS. 7-9. The cable guide unit 300 is shown in the tower 102. The cable guide unit 300 with the top ring 310 and the bottom ring 350 is shown in FIG. 7 in a maximally twisted state. The bottom ring 350 is hereby lifted up by the maximum amount.

The cable guide unit 300 with the top ring 310 and the bottom ring 350 inside the tower 102 is shown in FIG. 8. A state is shown in particular in FIG. 8 in which the cable guide unit with the cables 200 fastened thereto is situated in a partially twisted state, i.e., the bottom ring 350 is lifted up by less than its maximum amount.

The cable guide unit 300 inside the tower 102 is shown in FIG. 9. The cable guide unit 300 with the cables 200 fastened thereto is shown in FIG. 9 in an untwisted state.

The invention claimed is:

1. A wind turbine, comprising:
a tower having a longitudinal axis,
a nacelle rotatably mounted on the tower,
a plurality of cables extending from the nacelle into the tower,
a transport unit fastened inside the nacelle, the transport unit being configured to transport loads inside the tower to the nacelle or down to the ground, wherein the transport unit includes:
a cable guide unit with a plurality of rings, wherein the plurality of cables are fastened to a circumference of the plurality of rings so that a region inside the plurality of rings is kept free for transporting the loads,
a supporting structure, and
a line coupled to the supporting structure and extending into the region inside the plurality of rings, wherein the line is configured to travel between the nacelle and the ground within the region inside the plurality of rings to transport the loads,
wherein a top ring of the plurality of rings is fastened to the nacelle and a bottom ring of the plurality of rings is fastened non-rotatably in or on the tower, wherein the bottom ring engages with a non-rotatable guide that extends in a direction that is parallel to the longitudinal axis of the tower.

2. The wind turbine according to claim 1, wherein the plurality of cables are arranged at an outer circumference of the rings.

3. The wind turbine according to claim 1, wherein the bottom ring has at least two ring guides that engage with the non-rotatable guide.

4. The wind turbine according to claim 1, wherein distances between cables that are located radially opposed from each other and between adjacent rings are considered when calculating the maximum available internal diameter of the rings for transporting the loads.

5. The wind turbine according to claim 1, wherein the line is a chain or a rope.

6. A wind turbine, comprising:
a tower having a longitudinal axis;
a nacelle rotatably mounted on the tower;
a plurality of power cables extending from the nacelle into the tower;
a cable guide unit that includes a plurality of rings and a bottom ring, the plurality of power cables being coupled to a circumference of the plurality of rings and the bottom ring so that regions inside the plurality of rings and the bottom ring are kept free to transport loads between the nacelle and the ground, wherein the plurality of rings are configured to rotate, wherein the bottom ring does not rotate and engages with a non-rotatable guide inside of the tower; and
a lifting device fastened to the nacelle and configured to lift a load through the plurality of rings, the lifting device including a line that extends through the plurality of rings and to lift the load through the plurality of rings.

7. The wind turbine according to claim 6, wherein the line is a chain or a rope.

8. The wind turbine according to claim 6, wherein the bottom ring is coupled to the non-rotatable guide by a ring guide that slides linearly within the non-rotatable guide.

9. The wind turbine according to claim 8, wherein as the ring guide slides linearly in the non-rotatable guide, the bottom ring slides linearly inside of the tower.

10. The wind turbine according to claim 6, wherein the plurality of power cables are coupled to the circumference of the plurality of rings and the bottom ring by cable ties.

* * * * *